United States Patent
Lamy et al.

(10) Patent No.: US 7,307,740 B2
(45) Date of Patent: Dec. 11, 2007

(54) METHOD FOR MEASUREMENT OF THREE-DIMENSIONAL OBJECTS BY SINGLE-VIEW BACKLIT SHADOWGRAPHY

(75) Inventors: Francis Lamy, Arnay le Duc (FR); Ghislain Pascal, Talant (FR); Yvon Voisin, Montchanin (FR); Alain Diou, Le Creusot (FR)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 10/547,783

(22) PCT Filed: Mar. 10, 2004

(86) PCT No.: PCT/FR2004/050099

§ 371 (c)(1),
(2), (4) Date: Sep. 6, 2005

(87) PCT Pub. No.: WO2004/083772

PCT Pub. Date: Sep. 30, 2004

(65) Prior Publication Data

US 2006/0215180 A1    Sep. 28, 2006

(30) Foreign Application Priority Data

Mar. 12, 2003   (FR)   ................... 03 50045

(51) Int. Cl.
*G01B 11/06*    (2006.01)

(52) U.S. Cl. ...................................... 356/632
(58) Field of Classification Search ............... 356/632
See application file for complete search history.

(56) References Cited

U.S. PATENT DOCUMENTS

| 3,994,599 A | | 11/1976 | Southwell | |
|---|---|---|---|---|
| 4,168,907 A | * | 9/1979 | Presby | ...................... 356/73.1 |
| 6,859,285 B1 | * | 2/2005 | Chang | ........................ 356/601 |

FOREIGN PATENT DOCUMENTS

| FR | 2 335 824 | 7/1977 |
|---|---|---|
| WO | 01/65204 | 9/2001 |

OTHER PUBLICATIONS

Haralick. "Digital Step Edges from Zero Crossing of Second Directional Derivatives", IEEE Transactions on Pattern Analysis and Machine Intelligence, vol. pami-6, No. 1, pp. 58-68.
Sado et al. "Les plans d'experiences. De l'experimentation a l'assurance qualite", Afnor Technique, pp. VII, X, 89-107, 201-220 1991.

\* cited by examiner

*Primary Examiner*—Roy M. Punnoose
(74) *Attorney, Agent, or Firm*—Oblon, Spivak, McClelland, Maier & Neustadt, P.C.

(57) ABSTRACT

A method for measuring three-dimensional objects by single view backlit shadowgraphy. To measure at least one geometrical parameter of such an object, for example the thickness of a hollow sphere, translucent or transparent to visible light, optical characteristics of the object are determined, by which at least one optical model of the propagation of light through the object is established. This model includes an equation that relates the parameter to the result of an observation directly performed on an image of the object, the object being acquired by observing the object by single view backlit shadowgraphy. The image is acquired, the observation is performed, and the parameter is determined by the equation and the result of the observation.

15 Claims, 4 Drawing Sheets

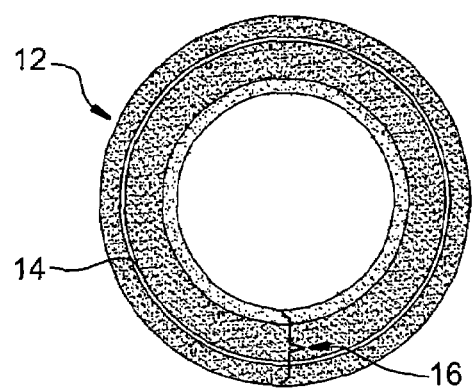
FIG. 2A
FIG. 2B
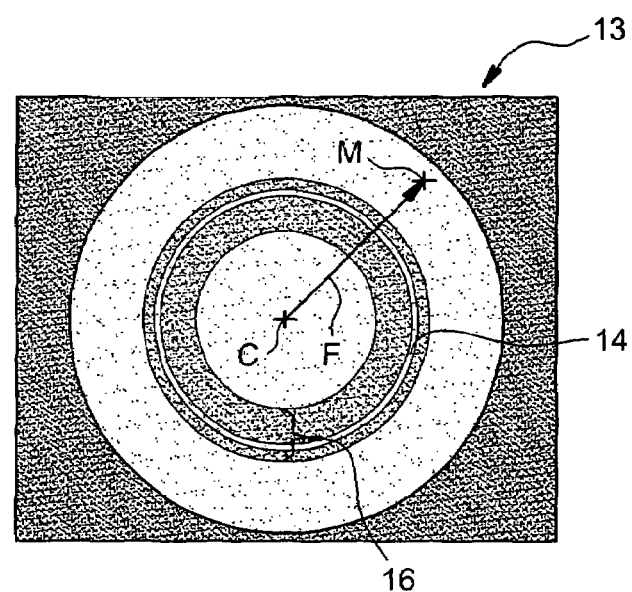
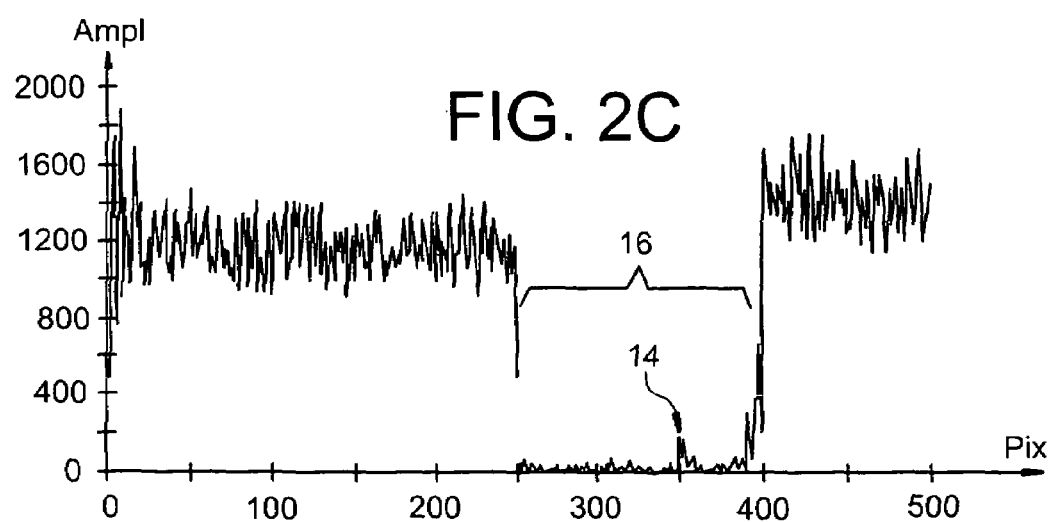
FIG. 2C

METHOD FOR MEASUREMENT OF THREE-DIMENSIONAL OBJECTS BY SINGLE-VIEW BACKLIT SHADOWGRAPHY

TECHNICAL FIELD

The present invention relates to a method for contactless measurement or characterization of three-dimensional objects, more particularly three-dimensional objects which are transparent to a visible light or at least translucent relatively to this light.

The invention is notably applicable:
- to the contactless measurement of the thickness of a transparent hollow sphere or a transparent hollow cylinder,
- to the contactless measurement of the thickness of a transparent layer or a transparent coating, placed inside such a sphere or such a cylinder,
- to the contactless measurement of the deformation or the roughness of the internal surface of such a sphere or such a cylinder, and
- to the contactless measurement of deformation or the roughness of a transparent layer or transparent coating, placed inside such a sphere or such a cylinder.

STATE OF THE PRIOR ART

In order to measure without any contact a three-dimensional object, the use of three-dimensional tomography is known.

However, this technique requires that the object be observed under several incidences, which is not possible in the case when the object is placed in a complex infrastructure.

If the object is three-dimensional, the use of a technique called single view tomography is also known.

According to the latter technique which requires X rays, an image is formed by means of a calculation code based on an object model selected a priori.

The thereby obtained image is compared with a simulated radiographic image and the model is then deformed iteratively until the simulated image coincides with the experimental image.

Reconstruction relies on an assumption of rotational symmetry of the object.

Single view tomography is thus a complex technique difficult to implement.

In addition, in order to measure thicknesses and diameters of hollow spheres, the use of interferometry and X radiography is known.

Interferometry is an accurate method, which may be used in a complex infrastructure, but is rather delicate to apply.

As for X radiography, it cannot be used when the object to be measured is placed in a complex infrastructure and cannot be handled from the outside of this infrastructure.

Thus, contactless measurement of dimensions of a three-dimensional and transparent (or translucent) object encounters many difficulties, in particular when the intention is to measure an internal characteristic of the object.

DISCUSSION OF THE INVENTION

The object of the present invention is to find a remedy to the previous drawbacks.

For this, it uses a backlit shadowgraphy measurement technique which is applied to characterizing observable objects under a single viewing angle, notably if it is difficult to access these objects. In addition, the invention preferably uses an image acquisition system which is focussed on a plane of the investigated object.

Specifically, the object of the present invention is a method for contactless measurement of at least one geometrical parameter of a three-dimensional object, this three-dimensional object being translucent or transparent relatively to a visible light, this method being characterized in that
- optical characteristics of the object are determined,
- by means of these optical characteristics, at least one optical model of the propagation of visible light through the object is established, this model including an equation which relates the geometrical parameter of the object to the result of an observation directly performed on an image of the object, this image being acquired by observing this object with the visible light, by single view backlit shadowgraphy,
- this image of the object is acquired,
- the observation is performed, and
- the geometrical parameter of the object is determined by means of the equation and the result of the observation.

Preferably, the optical model is further established from experiments and the image is acquired by means of a system for acquiring images in visible light, by performing the focussing of this image acquisition system on a sectional plane of the investigated object.

According to a preferred embodiment of the method, subject of the invention, ray tracing software intended for obtaining images of objects is used in order to determine the model, this software making it possible to know the influence of the object on the propagation of the visible light.

Preferably, in addition, simulations of backlit shadowgraphy images of auxiliary objects are performed to establish the model, these auxiliary objects having different respective geometrical characteristics and these simulations of images are combined by a multilinear regression.

This multilinear regression preferably applies a criterion for minimizing the error in the sense of the least squares, for example.

A ray tracing software may be used for performing the simulations.

At least one geometrical parameter of a hollow object may notably be measured according to the invention from the image of a sectional plane of the object.

According to a first particular embodiment of the method, subject of the invention, the object is a hollow sphere, thereby having a wall, the geometrical parameter of the object is the thickness of this wall, the image of the hollow sphere including a white ring, and the external radius of the sphere is determined, the radius of the white ring on the image of the object is measured and the thickness of the wall is determined according to the external radius of the sphere and to the radius of the white ring.

According to a second particular embodiment of the method subject of the invention, the object is a hollow cylinder, thereby having a wall, the geometrical parameter of the object is the thickness of this wall, the image of the hollow cylinder including a white ring, and the external radius of the cylinder is determined, the radius of the white ring on the image of the object is measured and the thickness of the wall is determined according to the external radius of the cylinder and to the radius of the white ring.

The external radius may be determined by the method of directional derivatives.

According to a particular embodiment of the invention, the object is hollow and contains a layer or a coating of a material which is transparent or translucent, and the thickness of this coating or of this layer is determined.

According to another particular embodiment of the invention, the object is hollow and includes an internal wall, and the deformation or the roughness of this internal wall is determined.

According to a preferred embodiment of the invention, a backlit shadowgraphy device is used comprising a source of visible light, means for collimating this source and means for acquiring images, including an optics, an image sensor, and means for adjusting the numerical aperture of the optics, this optics being placed between the object and the image sensor and allowing the image of the sectional plane of the investigated object to be formed on the image sensor, and the collimation of the source and the numerical aperture of the optics are adjusted.

The image sensor may comprise a charge-transfer device.

The method subject of the invention has advantages: its implementation cost is low and the equipment required for this implementation is relatively easy to install in a complex infrastructure as this equipment is limited to a light source and a camera.

BRIEF DESCRIPTION OF THE DRAWINGS

The present invention will be better understood upon reading the description of exemplary embodiments given hereafter, as purely indicative and by no means limiting, with reference to the appended drawings, wherein:

FIG. 2C shows the profile of a half-line of the simulated image of FIG. 2B.

DETAILED DESCRIPTION OF PARTICULAR EMBODIMENTS

Figure 1A:
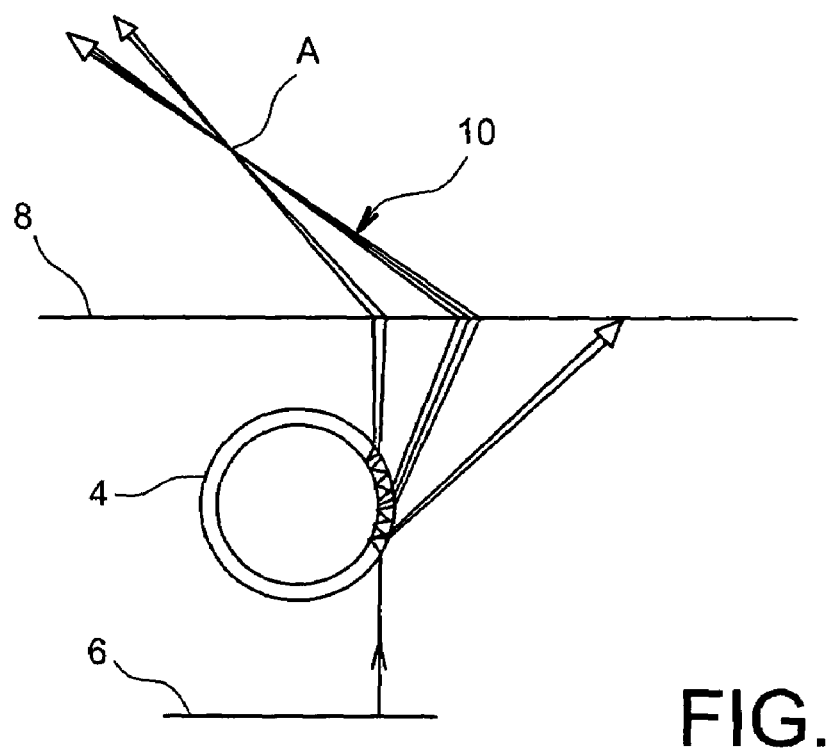
FIGS. 1A and 1B schematically illustrate the formation of white bands, for hollow spheres, the respective walls of which have different thicknesses, FIGS. 2A and 2B respectively show a real image and a simulated image of a hollow sphere.
Figure 1B:
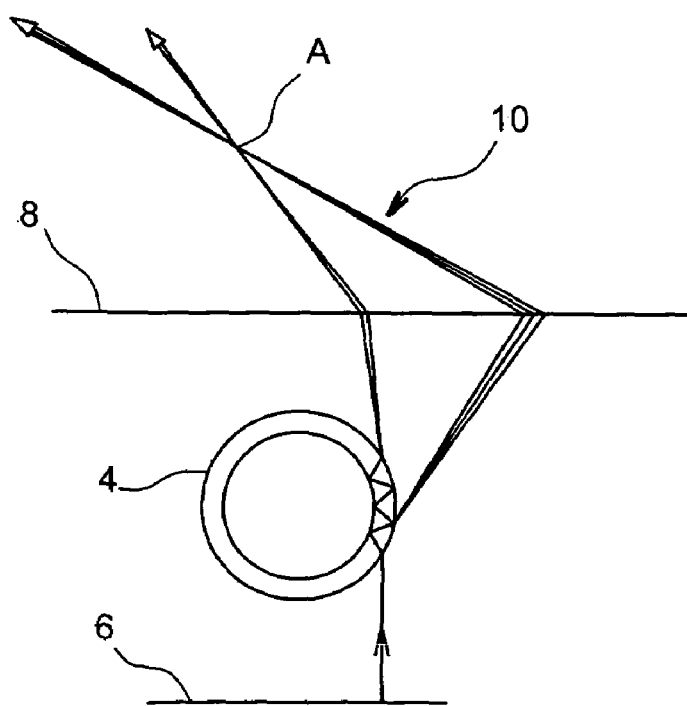

The measurement principle, which is used in the invention for measuring an object, is based on the observation of the object by backlit shadowgraphy in visible light, associated with an optical model for the propagation of light.

This measurement principle takes into account the physical phenomena of light propagation in the different translucent or transparent materials which the object includes, notably at the different interfaces of the object, and enables the measurement directly performed on the backlit shadowgraphy image to be linked with internal physical dimensional quantities of the investigated object via the equation of the model.

Of course, for investigating a planar object, backlit shadowgraphy is a not very costly measurement method and is simple to use. By a direct measurement on the image of the object, it is possible to know the size of the object, for example.

However, for investigating an object in three dimensions by backlit shadowgraphy, direct analysis of the image does not provide sufficient information as the observed image of a section of the object is not uniquely the image of the section through the objective of the used backlit shadowgraphy device but also the image of the section through the objective and the object itself.

It would be possible to relocate the characteristics of the investigated section if the influence of the object on the propagation of the incident light beam was known. This influence may be described by equations of geometrical optics but the latter are only valid in certain domains (Gauss approximation, and, in particular, low refraction angle of light rays).

In the case when objects with a low radius of curvature are investigated by the method of the invention, the conditions required for using the equation of geometrical objects are not met.

In order to know the influence of the investigated object on the propagation of light, a ray tracing software may be used. This software applies the equations for the propagation of light rays through several optical dioptres which separate materials with different optical indexes.

With the knowledge of the optical characteristics of the object to be investigated, it is possible to create a mathematical model which relates an observed phenomenon on the obtained image to the actual dimensions of the investigated object, or more generally, to geometrical parameters of this object.

This mathematical model is obtained by combining results of measurements on simulated backlit shadowgraphy images, by means of multilinear regression. On this matter, reference will be made to the following document:

G. Sado, M. C. Sado, <<Les plans d'expériences. De l'expérimentation à l'assurance qualité>>, AFNOR 1991.

Hollow spheres have been investigated with the method of the invention. It is difficult to know the thickness of such a sphere by direct measurement on its backlit shadowgraphy image as the light rays are refracted on the different internal and external interfaces of the sphere.

On the backlit shadowgraphy image of a hollow sphere, a white ring appears. The latter is formed by superimposition of light rays which seem to emerge from the same point.

FIG. 1A (respectively 1B) schematically illustrates in a sectional view, the formation of this ring or band, at point A for a hollow sphere or ball 4, the external radius of which is 1000 µm and the thickness is 100 µm (respectively 200 µm). References 6, 8 and 10 respectively refer to the light source of the backlit shadowgraphy device used for forming the image, the objective of this device and the light rays which are issued from the source 6 and interact with the sphere 4 and the objective 8.

As a result of several simulations, it was found that the radius of this white ring is directly related to the thickness and to the external radius of the investigated sphere. The goal of the modelings is to relate this thickness and this external radius to the radius of the white ring.

Thus, by knowing the radius of the ring, or band, and the external radius of the sphere (the latter being easily measurable on the image, if the optical system of the backlit shadowgraphy device is focussed on the equator of the sphere), it is possible to determine the thickness of the sphere by using the equation of the model which is determined beforehand.

In the following, the different steps of a method according to the invention are described. This method is used for measuring the thickness of a hollow sphere.

FIG. 2A schematically illustrates an image 12 of an actual hollow sphere. The external radius of this sphere is 578 µm and its thickness 66 µm.

A simulated image 13 of such a hollow sphere (FIG. 2B) may also be formed.

In FIG. 2A, one observes the presence of a white ring 14 and of a black area 16 (the corresponding items of FIG. 2B having the same references). It is seen that:
- the radius of the white ring is related to the thickness of the hollow sphere,
- the width of the black area depends on the numerical aperture of the image acquisition system included by the backlit shadowgraphy device used.

In order to better appreciate the position of the white band (or white ring), a profile of the simulated image may be formed, this profile having as origin the center C of the simulated image and as arrival point a point M outside the sphere, as shown by the arrow F of FIG. 2B.

FIG. 2C shows the profile of a half-line of the simulated image, the numbers of the pixels (Pix) being in abscissae and the amplitudes (grey levels) in ordinates (Amp1).

The white ring 14 as well as the black area 16 are located in this FIG. 2C.

The model is obtained by a multilinear regression which relies on the criterion for minimizing the error in the sense of the least squares (see the document mentioned earlier).

The multilinear regression may be expressed by the following equation:

$$Y = {}^tXA + E$$

Y being the vector of the responses
$^tX$ being the transposed matrix of the test matrix,
A being the vector of coefficients
E being the error vector between the modelling and the tests.

The question is to find A by minimizing $^tEE$.

By using a ray tracing software, it is possible to simulate the backlit shadowgraphy pictures of several spheres with different radii and thicknesses.

Next, as the thickness of a sphere and its external radius are related to the corresponding radius of the white ring, the radius of this ring is measured on each picture.

The test matrix X (corresponding to the thickness and to the external radius of each simulated sphere) and the vector of responses Y (corresponding to the radii of the white rings) are thereby obtained. It is then possible to use multilinear regression in order to obtain a model such as:

$$R_{bde} = a_0 + a_1 R_{ext} + a_2 e$$

where $R_{ext}$ is the radius of the white band, $R_{bde}$ the external radius of the hollow sphere and e the thickness of this hollow sphere.

In an example given as a pure indication and by no means limiting, one obtains:

$$R_{bde} = 0.0089 + 0.9871 R_{ext} - 1.156 e$$

for $R_{ext}$ belonging to the interval [800 µm; 1400 µm] and e belonging to the interval [25 µm; 250 µm].

This result is used for determining from actual backlit shadowgraphy pictures, the thickness of the hollow sphere by measuring the external radius and the radius of the corresponding white ring.

The algorithm for processing the images will now be considered.

On the obtained images (initial image and image after histogram equalization), we may detect the external radius of the sphere and then the position of the white band.

In order to determine the external radius, we preferably use the method of directional derivatives. On this matter, the following document will be consulted:

R. M. Haralick, "Digital Step Edges from Zero Crossing of Second Directional Derivatives", IEEE Transactions on Pattern Analysis and Machine Intelligence, vol. PAMI-6, No 1, January 1984, pp 58-68.

This method relies on cancelling the gradient of the image and on maximizing the second derivative.

Thus, we obtain a center and a radius corresponding to the external surface of the sphere. From the center, radial profiles are plotted at all degrees.

Figure 3:
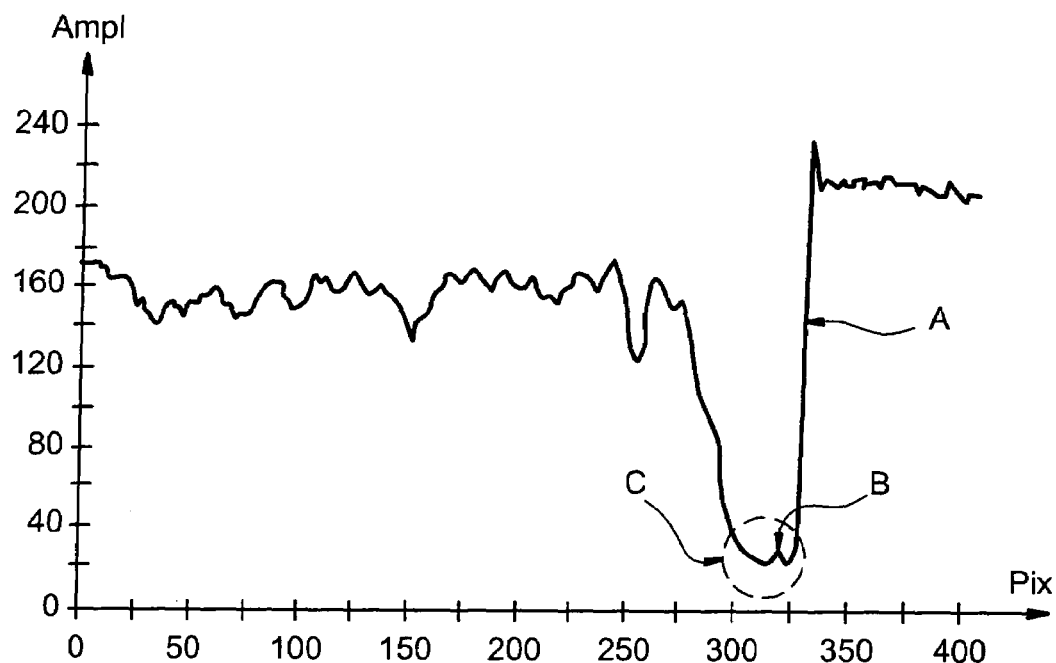
FIG. 3 shows a radial profile of an image to be processed.

FIG. 3 illustrates one of these profiles. The pixel numbers (Pix) are entered in abscissae and the amplitude (grey levels) are entered in ordinates (Amp1).

On each profile, we seek the point representing the position of the external surface (point A) and the position of the white band (point B).

Point A is obtained by cancelling the second derivative. Point B is obtained by reducing the investigation area of the profile (to the area delimited by circle C in the illustrated example) and by seeking the local maximum. In order to have a subpixel coordinate, the profile is locally adjusted to a Gaussian law.

Once these operations are completed, the thickness of the sphere, for this radius, is obtained by using the equation of the model. The internal and external surfaces of the sphere are reconstructed and it is then possible to know the average thickness of the sphere on the equator of the latter.

In order to validate the method of the invention, the results obtained by this method, by X radiography and interferometry in white light (microscopy with moving fringes) are compared. The obtained results are summarized in Table 1.

TABLE 1

| Thickness obtained by X radiography (µm) | Thickness obtained by interferometry (µm) | Thickness obtained by the method of the invention (µm) |
|---|---|---|
| 13.3 | 13.7 | 15.9 |
| 14.8 | 14.3 | 17.9 |
| 18.3 | 17.9 | 20.6 |
| 18.0 | 17.4 | 20.8 |
| 38.2 | 39.4 | 39.2 |
| 55.9 | 59.6 | 54.5 |
| 67.9 | Unmeasurable | 67.8 |

Comparison is made on the measurement of the average thickness of a sphere. The measurements which we have obtained are given to within ±3 µm at 2σ for X radiography and within ±2 µm at 2σ for interferometry.

As regards the method of the invention, it is considered that there is an uncertainty of the order of ±3 pixels for detecting the external radius and of ±0.5 pixel for determining the position of the white band.

The backlit shadowgraphy method for measuring the thickness of a hollow sphere according to the invention has the advantage of being not very costly and of being applicable very easily and rapidly. The use of this method requires adequate selection of the numerical aperture of the image acquisition system, which the backlit shadowgraphy device used includes, and of the emission diagram of the light source which this device includes, in order to obtain optimal conditions for properly viewing the white band.

The calculated model is only valid for a certain range of rays and a certain range of thicknesses for a given hollow sphere. This model may be improved by improving the accuracy of the optical characteristics of the material with which the sphere is made up.

The uncertainty of the measurement essentially depends on the spatial resolution of the image. In the relevant examples of the invention, the centre of the sphere is observed in order to be able to trace the radial profiles. Thus, the larger the radius of the sphere, the larger the micrometer-per-pixel conversion coefficient, and therefore the larger the uncertainty of measurement. This uncertainty of measurement therefore depends on the radius of the investigated sphere.

The apparatus used for backlit shadowgraphy is conventional. It comprises a collimated light source which emits visible light and which is associated with an image acquisition system which is intended to be focussed on a plane of the investigated object and the numerical aperture of which is adjustable.

Indeed, if this numerical aperture is increased, the intensity of the white ring is larger, but if the numerical aperture is too large, the ring is buried into the central spot of the image. Thus, the possibility of changing the numerical aperture of the image acquisition system facilitates detection of the radius of the white ring.

Figure 4:
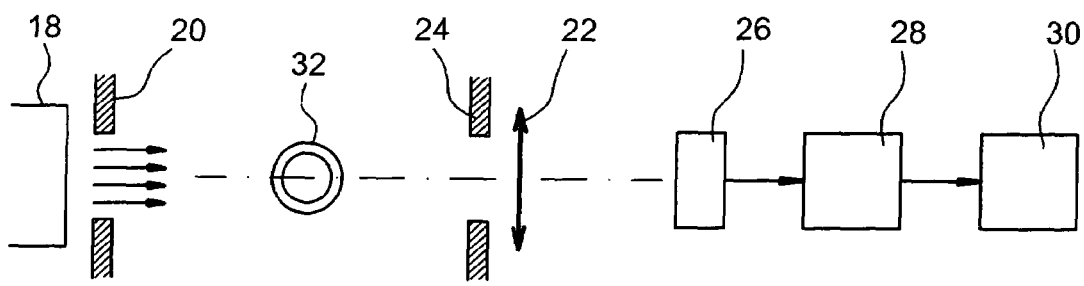
FIG. 4 is a schematic view of a device for applying a method according to the invention.

FIG. 4 is a schematic view of a backlit shadowgraphy device for applying the method, subject of the invention.

This device comprises a source 18 of visible light, adjustable collimation means 20 of this source and image acquisition means, including optics 22 which is provided with means 24 for varying the numerical aperture of this optics. The latter is followed by a CCD sensor 26 which is provided with means 28 for processing images, with which a display device 30 is associated.

A hollow sphere 32, which one wants to investigate, is placed between the source 18 and the optics 22. With this optics 22, it is possible to form the image of a plane of the section of the hollow sphere 32 on the CCD sensor.

The invention essentially relates to the method used for determining the thickness of the hollow sphere, i.e.:
- determination of the experimental conditions favouring easy detection of the radius of the white ring (numerical aperture of the image acquisition system, collimation of the light source),
- elaboration of the equation of the mathematical model relying on the characteristics of the investigated object and on the phenomenon observed on the image (external radius, thickness of the sphere and radius of the white ring), and
- associated image processing for determining the initial parameters of the model (radius of the white ring and the external radius of the sphere) in order to finally determine the desired dimension of the object (thickness of the hollow sphere in the relevant example).

The same method may be applied for characterizing the thickness of a hollow cylinder. For this application, the device of FIG. 4 may still be used (same light source and same image acquisition device), by positioning the cylinder in the place of the sphere 32.

On the obtained backlit shadowgraphy image a white band appears, which is related to the thickness and to the external radius of the cylinder. One seeks a new model and one applies it to the obtained image.

Figure 5A:
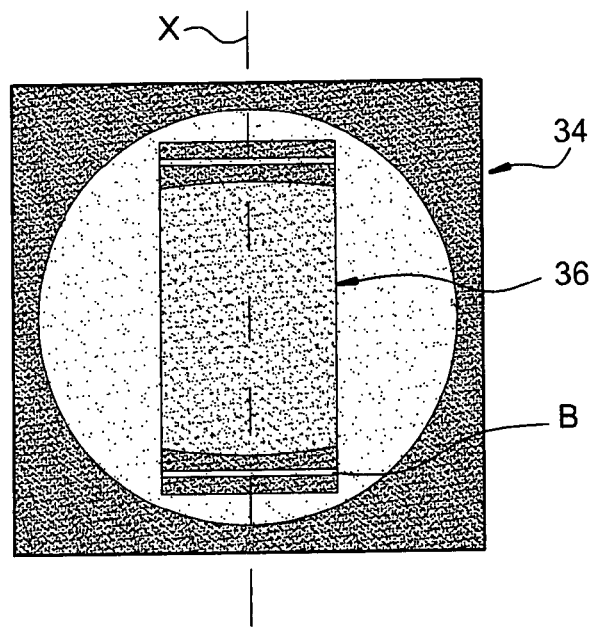
FIG. 5A shows the backlit shadowgraphy image of a hollow cylinder.
Figure 5B:
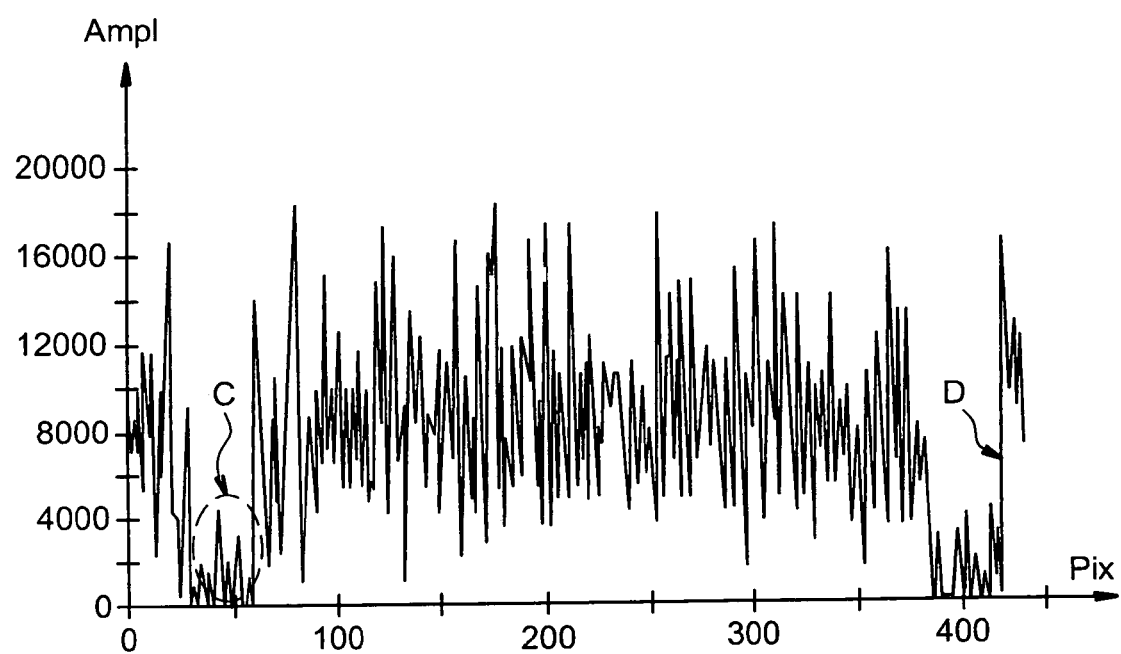
FIG. 5B shows the profile of the image of FIG. 5A.

FIG. 5A shows the backlit shadowgraphy image 34 of a hollow cylinder 36 with an external radius of 1,000 μm and a thickness of 300 μm. The profile of this image is illustrated in FIG. 5B. This profile is plotted along line X of FIG. 5A.

A white band B is observed in FIG. 5A. This white band corresponds to the area C in FIG. 5B. In the latter, the edge of the cylinder is located by the arrow D. The position of the white band is related to the external radius and to the thickness of the hollow cylinder.

By knowing the distance between the center of the white ring and each point of the latter, it is possible to determine the surface condition of the internal wall of the hollow cylinder, in terms of deformation and roughness, along an equator or two generatrices of the cylinder, in the plane of observation (which is perpendicular to the optical axis of observation).

In the case of a bilayered object, i.e., a hollow object on the internal wall of which a layer, a so-called internal layer, is formed, with the method subject of the invention, it is possible to measure the thickness of the internal layer provided that the thickness of the wall of the object, a so-called external layer, is known, which is then measured beforehand. The roughness and the deformation of the internal surface of the bi-layered object may thereby be measured.

The foregoing applies both to cylinders and spheres.

If it is desired to determine several geometrical parameters of the investigated object, it is possible to use several models simultaneously, with several measurable details on the backlit shadowgraphy image of the object. A system of equations with several unknowns is then solved.

The method, subject of the invention, may be used whatever the diameter of the sphere or of the cylinder. Indeed, by using an optical chain with a suitable magnification coefficient, it is possible to observe the whole of an object on a CCD sensor of 6.6 mm by 8.8 mm. It is even possible to observe a single portion of the object, provided that an appropriate optical system is available.

The only restriction, which is posed for measuring the thickness of the hollow sphere, is that it is sufficiently thick so that the white band is easily distinguished, given the resolution of the optical system.

Upon measuring the thickness of a hollow object, for example of a hollow sphere, according to the invention, the resolution of the optical system used for this measurement must be taken into account: for a given resolution, the sphere should be sufficient thick so that the white band may easily be distinguished.

The invention claimed is:

1. A method for contactless measurement of at least one geometrical parameter of a three-dimensional object, the three-dimensional object being translucent or transparent to a visible light, the method comprising:
   determining optical characteristics of the object;
   establishing with the optical characteristics at least one optical model of propagation of visible light through the object, the model including an equation that relates the geometrical parameter of the object to a result of an observation directly performed on an image of the object, the image being acquired by observing the object with the visible light by single view backlit shadowgraphy;
   acquiring the image of the object;
   performing the observation;
   determining the geometrical parameter of the object by the equation and the result of the observation; and
   displaying the geometrical parameter of the object.

2. The method according to claim 1, wherein the optical model is further established from experiments and the image is acquired by a system for acquiring images in visible light, by focusing the image acquisition system on a sectional plane of the object.

3. The method according to claim 2, wherein ray tracing software for obtaining images of objects is used to determine the optical model, the software allowing influence of the object on propagation of the visible light to be known.

4. The method according to claim 2, wherein simulations of backlit shadowgraphy images of auxiliary objects are further performed to establish the optical model, the auxiliary objects having different respective geometrical characteristics, and the image simulations are combined by a multilinear regression.

5. The method according to claim 4, wherein the multilinear regression applies an error minimization criterion of the least squares.

6. The method according to claim 4, wherein ray tracing software is used for performing the simulations.

7. The method according to claim 2, wherein the object is hollow and at least one geometrical parameter of the hollow object is measured from the image of a planar section of the object.

8. The method according to claim 7, wherein the object is a hollow sphere thus having a wall, the geometrical parameter of the object is the thickness of the wall, the image of the hollow sphere including a white ring, and the external radius of the sphere is determined, the radius of the white ring on the image of the object is measured, and the thickness of the wall is determined according to the external radius of the sphere and according to the radius of the white ring.

9. The method according to claim 8, wherein the external radius is determined by directional derivatives.

10. The method according to claim 7, wherein the object is a hollow cylinder thus having a wall, the geometrical parameter of the object is the thickness of the wall, the image of the hollow cylinder including a white ring, and the external radius of the cylinder is determined, the radius of the white ring on the image of the object is measured, and the thickness of the wall is determined according to the external radius of the cylinder and to the radius of the white ring.

11. The method according to claim 10, wherein the external radius is determined by directional derivatives.

12. The method according to claims 2, wherein the object is hollow and contains a layer or a coating of a material that is transparent or translucent, and the thickness of the coating or of the layer is determined.

13. The method according to claim 2, wherein the object is hollow and includes an internal wall, and deformation of the roughness of the internal wall is determined.

14. The method according to claim 2, wherein a backlit shadowgraphy device is used, comprising a source of visible light, means for collimating the source, and means for acquiring images, including an optics, an image sensor, and means for adjusting numerical aperture of the optics, the optics being placed between the object and the image sensor and enabling the image of the sectional plane of the investigated object to be formed on the image sensor, and collimation of the source and the numerical aperture of the optics are adjusted.

15. The method according to claim 14, wherein the image sensor comprises a charge-transfer device.

* * * * *